(12) United States Patent
Panabaker et al.

(10) Patent No.: US 7,705,842 B2
(45) Date of Patent: Apr. 27, 2010

(54) FAST DISPLAY INITIALIZATION AND LIGHT UP

(75) Inventors: Ruston Panabaker, Bellevue, WA (US); Cenk Ergan, Bellevue, WA (US); Jack Creasey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/330,955

(22) Filed: Jan. 11, 2006

(65) Prior Publication Data

US 2007/0159491 A1 Jul. 12, 2007

(51) Int. Cl.
G06F 3/038 (2006.01)
G06F 1/26 (2006.01)
G09G 5/00 (2006.01)

(52) U.S. Cl. ............... 345/211; 345/698; 345/699; 713/320; 713/323

(58) Field of Classification Search ......... 345/204, 345/211, 698, 699, 212, 214; 713/172, 185, 713/323, 324; 358/404, 405, 409, 1.9
See application file for complete search history.

(56) References Cited

U.S. PATENT DOCUMENTS

| | | | |
|---|---|---|---|
| 5,627,569 A | 5/1997 | Matsuzaki | |
| 5,802,305 A * | 9/1998 | McKaughan et al. | ......... 709/227 |
| 5,963,193 A * | 10/1999 | Knox et al. | ......... 345/601 |
| 6,023,258 A | 2/2000 | Kuriyama | |
| 6,057,860 A | 5/2000 | Hoffert | |
| 6,226,017 B1 | 5/2001 | Goossen | |
| 6,326,942 B1 | 12/2001 | Akimoto | |
| 6,340,968 B1 | 1/2002 | Sung-Jin | |
| 6,473,091 B1 | 10/2002 | Iida | |
| 6,948,083 B2 * | 9/2005 | Eguchi et al. | ......... 713/323 |

| | | |
|---|---|---|
| 2002/0057247 A1 | 5/2002 | Lee |
| 2003/0098822 A1 | 5/2003 | Park |

(Continued)

FOREIGN PATENT DOCUMENTS

JP 05057565 3/1993

OTHER PUBLICATIONS

High Performance Flat Panel / CRT GUI Accelerator http://members.elysium.pl/ytm/doc-hardware/ct65548.pdf, Feb. 28, 1996.

(Continued)

*Primary Examiner*—Amr Awad
*Assistant Examiner*—Andre Matthews
(74) *Attorney, Agent, or Firm*—Workman Nydegger

(57) ABSTRACT

Described is a technology by which a computer display may quickly resume outputting video data following its awakening from a deep sleep state. Displayed settings are maintained in a memory, such as a memory of the display, while the display is in a sleep state. The settings are associated with a token maintained by a host computer system and display. Upon a need to awaken the display to output video data, the host computer system and the display communicate the token, whereby the display may confirm whether maintained settings are still valid for actual use with the host's video signals. If still valid, the display restores the maintained display settings as actual display settings. The restoring of previously maintained display settings is ordinarily significantly faster than conventional mechanisms that are presently used to configure a display upon wakeup, resulting in the user perceiving a near-instantaneous wakeup of a display.

16 Claims, 5 Drawing Sheets

U.S. PATENT DOCUMENTS

| | | | |
|---|---|---|---|
| 2003/0179161 A1 | 9/2003 | Yamamoto | |
| 2003/0231171 A1* | 12/2003 | Yokomichi et al. | 345/204 |
| 2004/0178971 A1 | 9/2004 | Goodart | |
| 2004/0183793 A1* | 9/2004 | Akaiwa et al. | 345/204 |
| 2004/0212610 A1* | 10/2004 | Hamlin | 345/211 |
| 2005/0078088 A1* | 4/2005 | Davis et al. | 345/163 |
| 2005/0162344 A1 | 7/2005 | Kang | |

OTHER PUBLICATIONS

Accurate image overlay on video see-through HMDs using vision and accelerometers http://ieeexplore.ieee.org/search/wrapper.jsp?arnumber=840505, Mar. 22, 2000.

zPM11—SuperVGA PCI Mezzanine Adapter http://www.physi.uni-heidelberg.de/physi/ceres/electronics/manuals/zPM11.pdf, Jun. 12, 1997.

* cited by examiner

FAST DISPLAY INITIALIZATION AND LIGHT UP

BACKGROUND

Although most computer components have become significantly faster as technology has advanced, personal computer displays still take a long time to "light up" for usage. This is true even though LCD-based monitors, which have become highly popular, are usually considerably faster to light up than CRT displays. For example, when returning from a reduced-power (e.g., deep sleep) mode, LCD displays typically take from two-and-a-half to six seconds from the time that they receive a valid video signal to when they turn on the backlight. One undesirable result of this lag is that the user has to wait for the display, and often winds up staring at a blank screen, even though the rest of the computer system is ready to be used.

Although there are various design concepts that display vendors may implement to reduce current "light-up" times, none of them are likely to substantially eliminate the user's waiting time. For example, with displays having many inputs that support a wide variety of video signals, vendors will likely be unable to get the light-up time to below two seconds, which is still a rather undesirable wait time. Leaving the host controller and display controller chipsets running might help speed up the restoration time, (e.g., leaving the host graphic chipset powered up ensures that the display is receiving active synchronization pulses so that the display is aware of its current mode), but is not a viable solution, as this consumes too much power to meet desired energy consumption requirements. In general, this is because leaving the host graphic chipset enabled prevents the majority of the display controller being powered down to save energy, and power savings typically comes from being able to power down significant portions of the host controller and the display controller.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards maintaining display settings while a display is in a sleep state, in which the maintained display settings correspond to actual display settings that the display previously used when awake to display video data. When the display subsequently awakes, the host computer communicates with the display to establish whether the host computer system's video signals can be properly displayed using the maintained display settings. If so, the display restores the maintained display settings as actual display settings.

The display and host computer system may each maintain a token that corresponds to a set of display settings. The token is communicated at wake time, e.g., from the host computer system to the display, whereby the receiver of the token may match the received token against its own maintained token. When the received token matches the previously maintained token, the set of display settings are used to generate video output based on video signals being received from the host computer system.

A memory at the display, at the host computer system, or both may be used to maintain the display settings while the display is in a sleep state, including the (display controller and/or the host graphics controller). Upon awakening, the host computer communicates with the display to establish whether a set of maintained display settings are still valid, e.g., the computer system as well as its last set of video settings have not changed since the display went into its sleep state. If established, the maintained display settings are restored to actual use by the display to generate output from the host computer's video signals.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
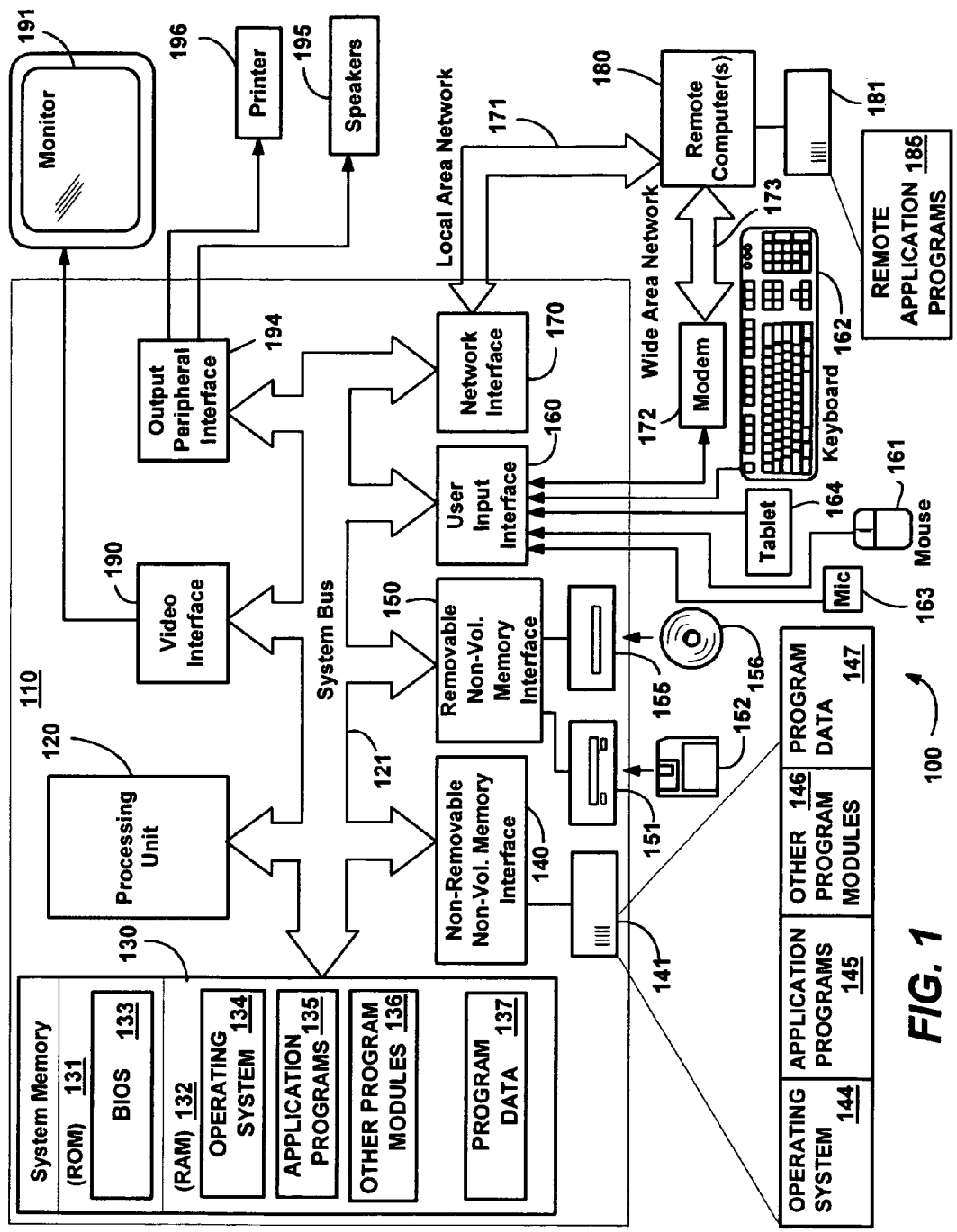
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

Fast Display Light Up and Initialization

Various aspects of the technology described herein are directed towards communicating information between a host computer and a display coupled (in any way) thereto, wherein as used herein, the term "display" refers to any device capable of outputting computer-provided visual information, including but not limited to monitors, televisions, digital picture frames, projection-type mechanisms, and so forth. In general, and as described below, the information communicated between the host computer and the display enables the display to be confident that the host computer to which the display is coupled (and/or vice-versa) has not changed, (e.g., has not changed video drive requirements or been switched to a different host computer or input port with new video display requirements, whereby the display can quickly restore its previous settings.

More particularly, the conventional display resume process takes considerable time, as the display needs to detect the signal from among possibly multiple inputs, analyze the signal to ensure it is valid, load appropriate firmware (the chipset) based on the signal, check via the firmware to determine information about the signal (e.g., resolution, timing data, and so forth) as well as determine that the screen is displaying output properly, make any necessary corrections, and then turn on the backlight. Instead, by persisting previous settings and establishing with the host computer that a set of previously persisted settings are correct, the previously persisted settings may be restored rather than recomputed, allowing the display to bypass most of its initialization and quickly light up. The fast light up (which may take as little as 200 milliseconds, but as long as 500 milliseconds) will be substantially faster than today's light up times, with the display's output appearing near instantaneous relative to contemporary restoration times.

In general, many of the examples herein are directed towards a particular example implementation in which the communication between the computer and the display leverages and extends the VESA™ (Video Electronics Standards Association)DDC/CI™ (Display Data Channel Command Interface) and MCCS (Monitor Control Command Set) (MCCS) standards, using at least one new VCP (video control panel) command. These standards (not including the enhancements described herein) are publicly available from VESA™, and will not be described in detail. Notwithstanding the examples below, it is understood that any communication protocol and/or mechanism may be used to implement the communication of control and video data described herein.

Thus, as is understood, the present invention is not limited to the examples, protocols, or other structure or functionality described herein. Rather, any of the examples described herein are non-limiting, and the present invention may be used in various ways that provide benefits and advantages in computing and display technology in general.

Figure 2:
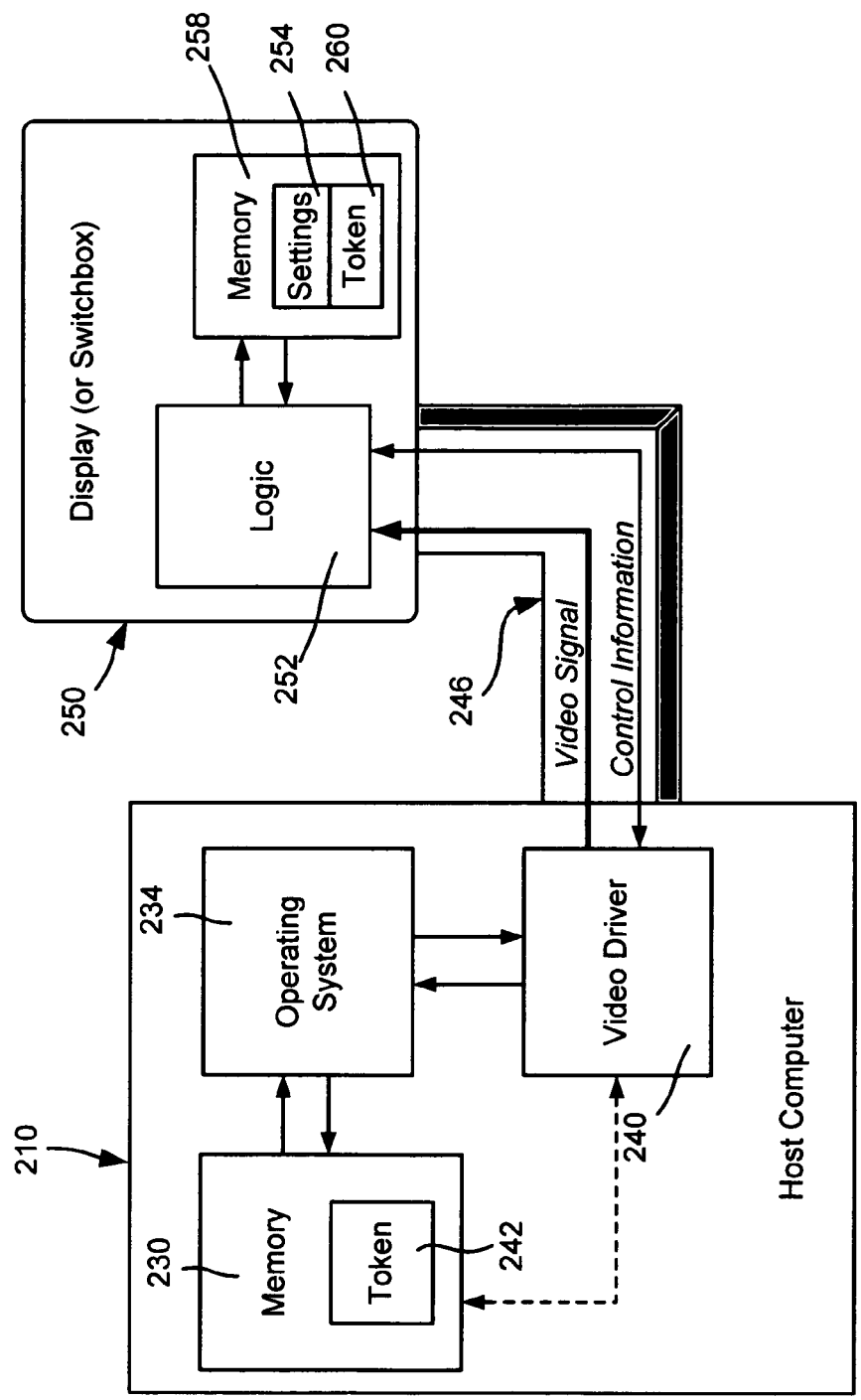
FIG. 2 is a block diagram representing example components in which a display stores its settings and provides a token to a computer system before entering standby, for use in restoring the settings upon resuming from standby.

Turning to FIG. 2 of the drawings, there is shown an example block diagram by which a host computer 210 (such as a machine based on the personal computer 110 of FIG. 1) communicates with a display device 250, (such as a device corresponding to the monitor 191 of FIG. 1). Note that the communication path 246 represented in FIG. 2 is shown as communicating video (and possibly audio) signals and control information on separate connections, which may take place using the same physical or wireless coupling. This is only one example however, as any type of communication connection may be used with any appropriate protocol, e.g., the control channel may be on an out-of-band channel, in-band, embedded in the video signal itself, some combination of the above, and so forth. The control channel and video signal may share a physical coupling (e.g., video cable), and may use the same wire set or a different wire set on the same physical cable.

Note that the "display" of FIG. 2 is alternatively labeled as a switchbox 250 (e.g., remoted over a network, and/or having direct cables and so forth that may connect multiple hosts to multiple displays. For example, a switch-box may be in between the host 210 and another display. The switchbox 250 may use data from the host 210 to make transitions faster for whatever set of at least one monitor/display is hooked up to the switchbox output, e.g., via tags the switchbox 250 may determine that it is switching between the same resolutions. A switchbox may also use these data itself, even if the connected host does not support them, when switching the display between one host and another. For purposes of simplicity, as used hereinafter, the term "display" refers to any consumer/processor of video data (signals and/or control information), even if only temporarily switching the data to another consumer/processor, and thus "display" is equivalent to and also represents a "switchbox."

In general, the operating system 234 or other process communicates video-related data and control information to a video driver 240, which then outputs the data and information for sending as signals in a known manner, e.g., via a graphics adapter card (not shown). As described below, one piece of control information that the operating system may maintain in memory 230 and send to the video driver 240 is a token 242, which is used by the display logic 252 to determine whether settings 254 persisted in display memory 258 are still valid following resume from a display reduced-power state. Alternatively, the video driver may maintain the token in its allocated portion of the memory 230. In any event, the token is able to be sent to the display 250 for processing. Note that in an environment with a single host providing signals to multiple displays, a token and corresponding settings may be persisted for each display to rapidly restore the correct settings for actual usage.

The token corresponds to a new/enhanced protocol between the host computer 210 and the display 250 which allows the display 250 to save its current settings and then subsequently restore them when requested by the host computer 210. A primary result is a display which resumes very quickly from a blanked or energy saving mode, appearing to a user to come on almost instantly. One example protocol between the host computer 210 and the display device 250 may be implemented in the form of a new VCP (Virtual Control Panel) op-code/command; op-codes are generally specified in the VESA MCCS 2.0 specification. The new VCP command may be sent at any time, however to avoid sending unnecessarily, the command may be sent just before the host intends to stop sending video and synchronization signals. Note that after some delay time, when the display stops getting a video and synchronization signal, the display typically enters a deep sleep state. The monitor may also be put into a deep sleep state, e.g., by a VCP command.

In general, the "persist settings" command comprises a packet that includes a field containing a token, e.g., a value that is uniquely generated by the host. When the display 250 receives this command packet, its logic 252 takes action to make it possible to later rapidly reload its exact current state, so that the display can quickly handle similar video signals after being restored from a deep sleep state.

To this end, the display logic preserves a copy of the token 260 (which need not be an exact copy, but may be a value corresponding to the token value, such as a hash) with the current video settings 254, e.g., the current setup of the video processor including the registers that are specific to the current video stream. The display 250 may return a command acknowledging receipt, and may return a different or modified token that allows the host to uniquely identify the display model.

When the host computer 210 resumes from standby, and knows that it can send and will be sending the same video signal it had previously sent to the display 250, the host computer 210 will issue a "restore settings" command or the like with the same token (the host copy 242) that the host computer 210 had previously sent. The host computer 210 also initializes and sends video signals as quickly as possible.

When the display 250 receives this command requesting a restore settings operation, the display logic 252 matches the host-provided token against the appropriate token 260 maintained in the display memory 258. If the token matches, the display restores its settings 254 and tries to show video as quickly as possible, without going through a conventional full detection and correction routine. Note that this same command can also be used for other scenarios, such as resume from inactivity, where the host stops sending video signals. The command may also be used for shutdown and hibernate scenarios, but only if the host is going to resume at the exact same video settings as it had at shutdown. Note that contemporary operating systems do not do this, but rather re-boot with low resolution, default settings. However, the token may be used to perform the boot using previous (including higher-resolution) settings, or the boot can start with default (e.g., low resolution) settings and rapidly be restored to a previous setting sometime during boot if the tokens match.

As should be understood, a primary purpose of the token is to indicate to the display 250 at restore time that the host computer 210, along with any of its video settings, have not changed since the display 250 went into its sleep state. Note that for most computer users, the vast majority of the time the same computer will remain coupled to the sleeping display, with no changes to settings occurring while the display slept. When the host computer's token 242 matches the display's token 260, this indicates no changes, and the display can safely restore its previous settings 254 from memory 258 to its operating registers and the like. Note that the operating registers may maintain their settings, such as via a trickle refresh charge, in which case the re-loading would simply comprise restoring full power.

Note that any change, such as connecting a different computer system to the display, or changing a video setting on the same computer system, may make the display unintelligible, whereby the user would not be able to see output in order to make a correction. As a result, a failsafe may be provided if necessary to overcome some problem due to an unusual circumstance or bug. One such failsafe will be for the user to disconnect the power to the monitor or perform some other action (e.g., hit a certain keyboard combination, hit the monitor power button some number of times in succession, hold the monitor power button to force a reset, and so forth) so that the display will lose or clear its persisted token, resulting in a conventional full detection and correction routine being run.

In a typical resume from sleep state, to ensure that no changes occurred, the token comprises some value that is unique within the computer's and display's environment, e.g., a GUID, a random or pseudo-random number, a timestamp and so forth that may be combined in some way with some unique host identification value, such as a MAC address. Note that the host may delete any token that may be present whenever there is a change made to the video settings that might affect the display's ability to output meaningful video, so that inadvertent token matching cannot occur. Deleting may not necessarily be performed for any change, e.g., a change such as portrait to landscape orientation may be able to be handled via another command and/or a set of flags accompanying the token, whereby the settings can be restored as well as modified in conjunction therewith, resulting in a faster display restore relative to restoring by performing the contemporary full detection and correction routine. Also, a temporary change that is changed back need not be considered a change.

In general, in the example implementation of FIG. 2, when the host computer wants to wake the display 250, e.g., upon returning from its own standby state, the host computer 210 will regularly output the token 242, e.g., with an extended VCP wakeup (with token) command. To ensure that the display sees the command as soon as it wakes sufficiently to process commands, the extended VCP op-code may be repeatedly sent very frequently, until the display either acknowledges the command (which may be a yes, can restore or no, cannot restore acknowledgment), or a timeout without acknowledgement occurs. Note that the timeout is primarily for displays that do not understand the VCP command set; another test can be used for a display that has responded to at least one other VCP command. This is because another VCP command response indicates that the display 250 is operational and responding to VCP commands, and the host can send the "restore settings" (with token) command at least one more time, whereby the display logic 252 will either acknowledge the extended command, or will be known to be VCP-capable but not capable of handling the extended command.

It should be noted that another way to speed up the display's awakening process is to change the way the display senses video signals among multiple inputs. Typically, displays sense for signals in a round robin fashion, e.g., sense at input A for awhile, then at input B, then at input C, then at input D, then back to A and so on. This can be time consuming, particularly when the signal arrives at an input just after that input has been sensed, requiring a full cycle through each other input before returning to sense the signal. An improved way to detect signal presence is to have the display persist which input was last used, and more frequently sense at that last-used input. For example, if input B was last used, the pattern may be input B, input A, input B, input C, input B, input D, on the assumption that the same input is likely to be used again. More sophisticated sensing patterns may be employed for displays in which multiple inputs tend to be frequently used.

In general, if the tokens match, the display's preserved settings are reloaded into the display registers for rapidly providing video output. Note that the display is not limited to one token and one set of settings, but rather may maintain settings corresponding to multiple tokens, and then use a given matching token as an index or the like into settings for that token. For example, different host computers may be connected, with one set of settings rapidly loaded for each based on each host computer's token. As another example, the same host computer may have different users, each of which have a corresponding token maintained therefor (e.g., by the logon code), whereby a different token is sent depending on the user. If the display maintains settings for each token, each token may correspond to different settings that are automatically and rapidly loaded for a given user, e.g., different resolutions as needed by different users because of differences in vision or because of other preferences. Settings may be maintained at the display for both different users and different host computers. The video driver 240 or 340 may maintain the token and/or settings data if there is only one corresponding set per machine.

Figure 3:
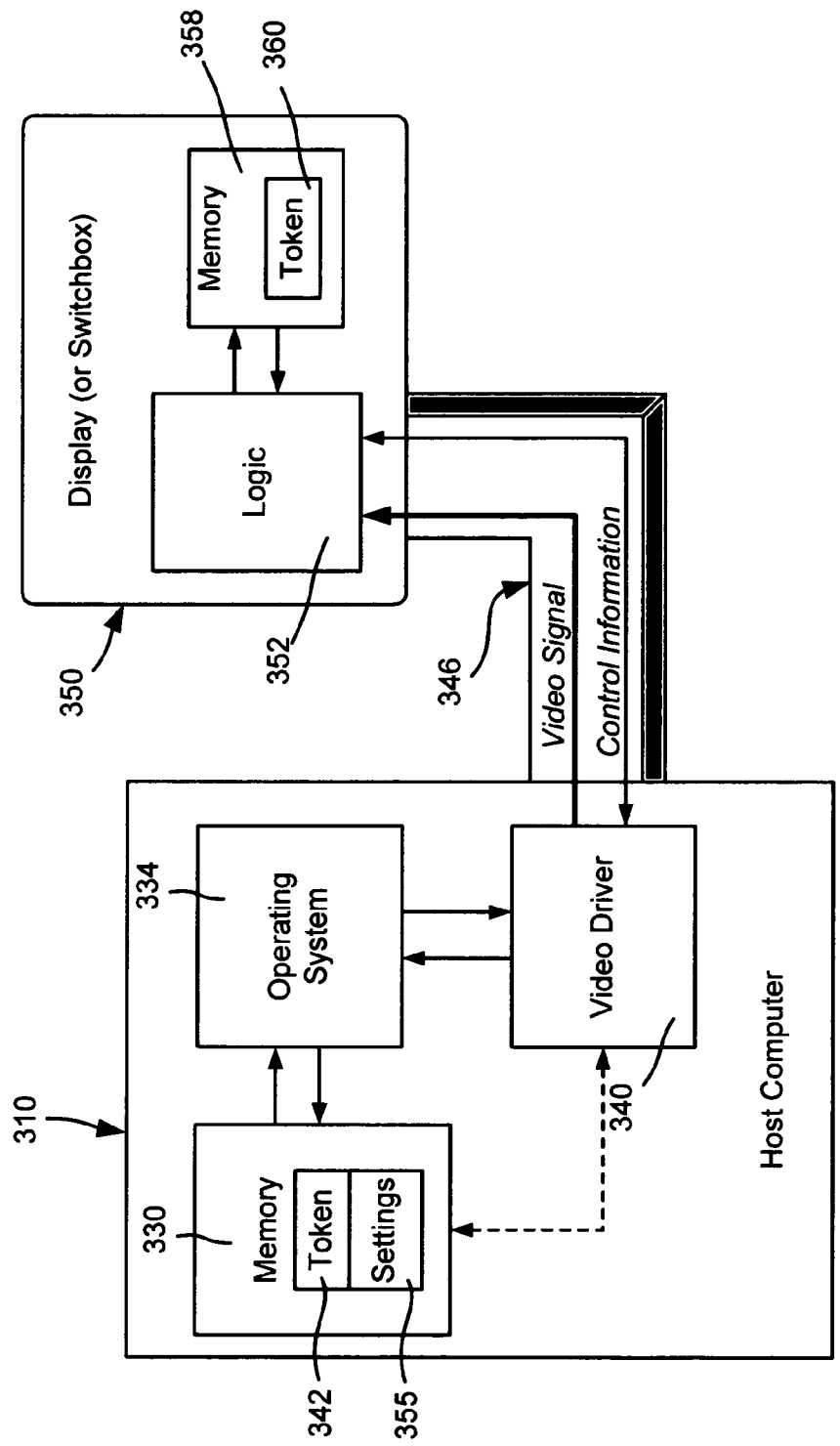
FIG. 3 is a block diagram representing example components in which a computer system stores display settings for restoring the display's settings when the display provides a matching token upon resuming from standby.

FIG. 3 is a representation of an alternative implementation in which the host computer 310 caches some or all of the display settings for the display 350. Such an implementation allows the display 350 to require less memory, and may provide other benefits, such as the ability to store the settings for a large number of profiles. While requiring that at least some of the display settings (e.g., the settings themselves, a subset thereof, and/or any differences from a default set or current set) be communicated to the host computer, the benefit of less memory on the display along with the flexibility of being able to maintain a relatively unlimited number of settings on the host computer's storage system may be beneficial in some usage scenarios. Note that the token can be used by either the host graphic controller and the display controller, or both, so it is of benefit when the host computer or its graphic subsystem are in an energy saving mode, and/or connected to multiple displays Other alternatives include sending multiple tokens and receiving a response as to which one (if any) matched. A polling-type model is also feasible, in which a failure because of a non-recognized mismatch results in a new token being tried, until either a match is found or no tokens remain to try. Alternatively a returned error response may include a token, so the receiver can see if it matches one previously used.

Still another alternative when a token is not recognized is for the matching code to pass back another token or other response/value, indicating that a certain set of settings can be immediately applied if the other agrees. This may be a temporary agreement to show at least some meaningful output, until a new set of settings can be negotiated.

Figure 4:
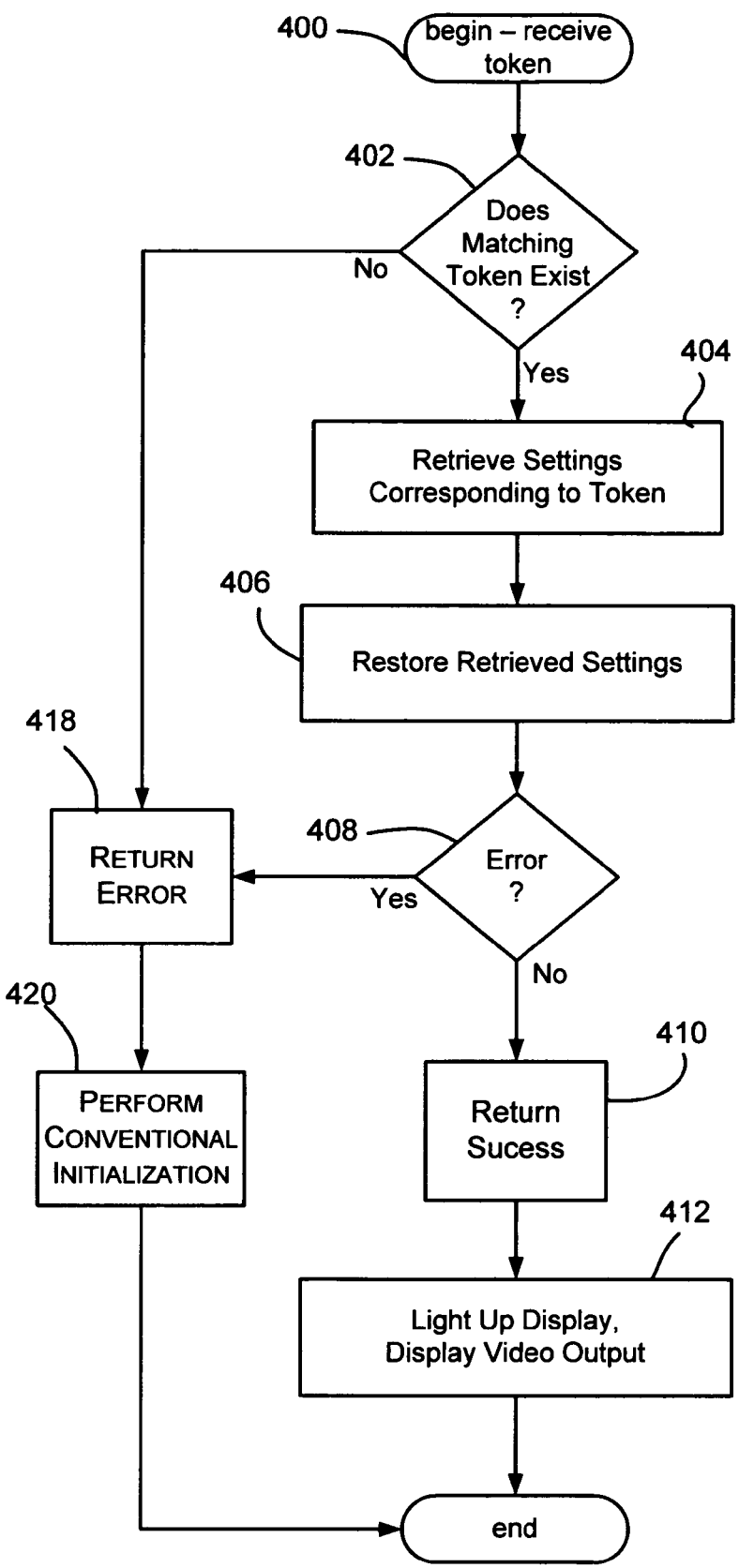
FIG. 4 is a simplified example flow diagram representing example steps that may be taken by a display in restoring the display's settings based upon a matching token.

FIG. 4 summarizes sample logic for a simple, single token matching implementation, beginning at step 400 when a token is received, e.g., at the display logic 252. Step 402 evaluates whether the token matches. If not, an error is returned at step 418, and in this simplified example in which no other token or alternative is considered, step 420 is executed to perform conventional initialization, e.g., full signal detection and settings correction.

If instead the matching logic finds a match at step 402, step 404 retrieves the maintained settings, and step 406 applies them, e.g., to the display's operating registers. Note that the settings may be stored at the display device (as in FIG. 2), or step 404 may obtain them from the host computer (as in FIG. 3).

Step 408 evaluates testing for an error. This may occur for any reason, such as detecting that while the token matched, something changed somehow and there is a problem with the signal such that it no longer corresponds to the settings. Also, the user may indicate an error, such as by turning on and off the display in a manner that indicates that something is likely wrong, by holding down a display power button or hitting a reset switch (if provided), via a keyboard combination that results in a reset command being sent to the display, or any other type of error. In such an event, step 408 branches to step 418 where an error (which may be different than a mismatch errorcode) is returned, and then to step 420 where conventional initialization is performed.

In the highly-likely event where the token matched and there was no error (step 408), step 410 is executed to return a success. Step 412 represents lighting up the display using the loaded settings, and using the settings to display video output. As can be readily appreciated, by avoiding step 420, rapid restoration is accomplished.

Figure 5:
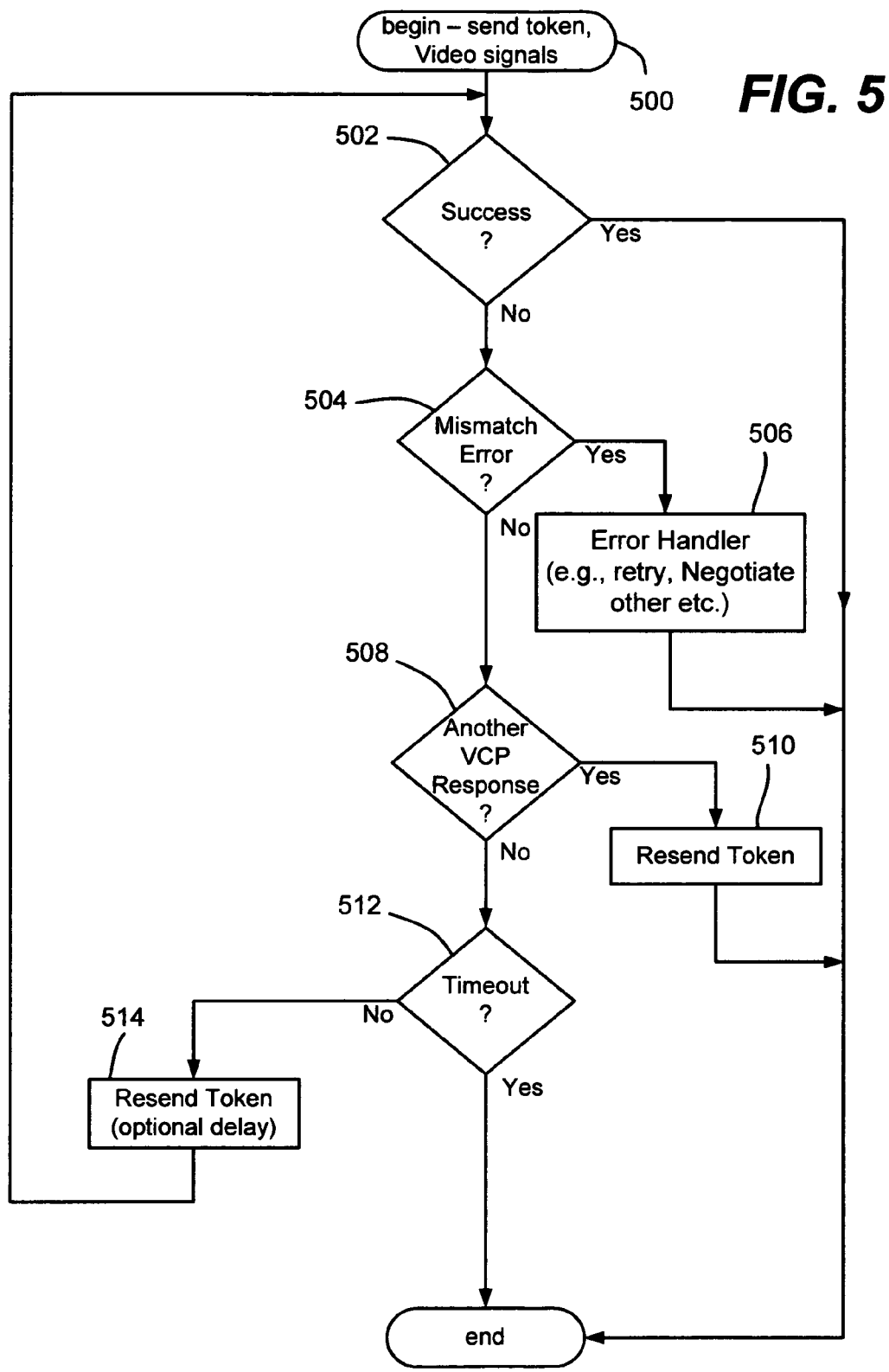
FIG. 5 is a simplified example flow diagram representing example steps that may be taken by a host computer system to restore a display's settings based upon a matching token.

FIG. 5 represents simplified example steps from the host computer system's perspective, beginning at step 500 where a token is first sent, e.g., with an extended restore settings VCP command, along with video signals. Step 502 evaluates for a response/acknowledgement indicating success, and if detected, ends the process.

If not a success (at least not yet), step 504 is performed to look for a mismatch error response, which is an acknowledgement. If a mismatch, step 506 represents taking some error handling action, e.g., sending a different token, negotiating a temporary setting, or some other action, as described above. Note that in the simplified display logic of FIG. 4, there is no corresponding error handling logic, and thus step 506 is not needed in such a combination.

Step 508 tests for whether the display has responded to another VCP command. If so, it is known by the host computer system that the display is awake and operating, and understands VCP, although not necessarily the "restore settings" extension thereto. Step 510 resends the token (e.g., in the restore settings command) one additional time, and the startup process ends. Note that instead of ending, a success versus mismatch test may be performed, after some delay to allow the display time to process the command, if there is some error handling possibilities, e.g., to try a different token. However, in a simplified single token implementation such as described with reference to FIG. 4, this is not necessary, as the display will either handle the command/token sent via step 510 and restore the settings, or will not.

Step 512 represents a timeout test that is used for non-VCP capable displays. In general, such displays will ignore VCP commands, and eventually via the timing out at the host, the host will stop sending them. If not timed out, there is a possibility that the display is capable of handling the restore settings VCP extension, but that it has not yet detected the video signals or sufficiently awakened to process the VCP commands. Thus, as described above, the token is re-sent. Some (optional) delay is taken to ensure that although the command and token are sent repeatedly and often to facilitate rapid response, the command and token will not be sent so quickly that they flood the control channel.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium having computer-executable instructions, which when executed by a processor of a computing system perform steps for quickly initializing a display, comprising:

sending a first command to a display indicating that the display should store its current display settings, the first command including a first token, wherein the first command is sent by a host computer system to which the display is attached and from which the display is receiving a first video signal, the first command indicating that the host computer system is about to enter a sleep state, and wherein the display includes a video processor and registers that are configured according to the current display settings to display the first video signal, and wherein the first token is a value that is generated by the host computer system to represent characteristics of the first video signal and is different than the first video signal;

in response to the first command, storing the current display settings with the first token before the display enters the sleep state, such that after the current display settings and the first token are stored, the host computer system and the display enter the sleep state;

upon awakening from the sleep state, the host computer system detecting that it will be sending a second video signal that has the same characteristics as the first video signal;

the host computer system sending a second command to the display, the second command including a copy of the first token to indicate to the display that the host computer system will be sending the second video signal that has the same characteristics as the first video signal;

upon receiving the second command, confirming, when the display is in a subsequent wakened state, that the copy of the first token is the same as the stored first token indicating that the display can properly display the second video signal using the stored display settings; and restoring the stored display settings as actual display settings by configuring the video processor and the registers according to the stored display settings when the display is in the subsequent wakened state such that the display may commence displaying the second video signal using the stored display settings without performing a full detection and correction routine.

2. The computer-readable storage medium of claim 1 wherein storing the display settings comprises persisting at least some of the display settings in a memory of the display.

3. The computer-readable storage medium of claim 1 wherein storing the display settings comprises persisting at least some of the display settings in a memory of the host computer system.

4. The computer-readable storage medium of claim 1 wherein a plurality of display settings is stored, and having further computer executable instructions comprising locating the corresponding set of display settings from among the plurality of sets based on the copy of the first token.

5. The computer-readable storage medium of claim 1 having further computer-executable instructions comprising, communicating information from the display to the host computer system indicating that the stored display settings have been successfully restored as the actual display settings.

6. The computer-readable storage medium of claim 1 wherein the display awakens upon detecting video signals at one input of a plurality of inputs, and having further executable instructions comprising, storing input information at the display as to which input of a plurality of inputs last received video signals from the host computer system, and using the input information to detect for video signals more frequently at the last input than at another input.

7. In an environment having at least one computer system and at least one display, a method for quickly initializing a display comprising:

sending a first command to a display indicating that the display should store its current display settings, the first command including a first token, wherein the first command is sent by a host computer system to which the display is attached and from which the display is receiving a first video signal, the first command indicating that the host computer system is about to enter a sleep state, and wherein the display includes a video processor and registers that are configured according to the current display settings to display the first video signal, and wherein the first token is a value that is generated by the host computer system to represent characteristics of the first video signal and is different than the first video signal;

in response to the first command, storing the current display settings with the first token before the display enters the sleep state, such that after the current display settings and the first token are stored, the host computer system and the display enter the sleep state;

upon awakening from the sleep state, the host computer system detecting that it will be sending a second video signal that has the same characteristics as the first video signal;

the host computer system sending a second command to the display, the second command including a copy of the first token to indicate to the display that the host computer system will be sending the second video signal that has the same characteristics as the first video signal;

upon receiving the second command, confirming, when the display is in a subsequent wakened state, that the copy of the first token is the same as the stored first token indicating that the display can properly display the second video signal using the stored display settings; and restoring the stored display settings as actual display settings by configuring the video processor and the registers according to the stored display settings when the display is in the subsequent wakened state such that the display may commence displaying the second video signal using the stored display settings without performing a full detection and correction routine.

8. The method of claim 7 wherein storing the display settings comprises persisting at least some of the display settings in a memory of the display.

9. The method of claim 7 wherein storing the display settings comprises persisting at least some of the display settings in a memory of the host computer system.

10. The method of claim 7 wherein a plurality of display settings is stored, and having further computer executable instructions comprising locating the corresponding set of display settings from among the plurality of sets based on the copy of the first token.

11. In a computing environment having a host computer system and a display, a system comprising:

a processor; and a memory that stores instructions which when executed by the processor perform the following method for quickly initializing the display:

sending a first command to a display indicating that the display should store its current display settings, the first command including a first token, wherein the first command is sent by a host computer system to which the display is attached and from which the display is receiving a first video signal, the first command indicating that the host computer system is about to enter a sleep state, and wherein the display includes a video processor and registers that are configured according to the current display settings to display the first video signal, and wherein the first token is a value that is generated by the host computer system to represent characteristics of the first video signal and is different than the first video signal;

in response to the first command, storing the current display settings with the first token before the display enters the sleep state, such that after the current display settings and the first token are stored, the host computer system and the display enter the sleep state;

upon awakening from the sleep state, the host computer system detecting that it will be sending a second video signal that has the same characteristics as the first video signal;

the host computer system sending a second command to the display, the second command including a copy of the first token to indicate to the display that the host computer system will be sending the second video signal that has the same characteristics as the first video signal;

upon receiving the second command, confirming, when the display is in a subsequent wakened state, that the copy of the first token is the same as the stored first token indicating that the display can properly display the second video signal using the stored display settings; and restoring the stored display settings as actual display settings by configuring the video processor and the registers according to the stored display settings when the display is in the subsequent wakened state such that the display may commence displaying the second video signal using the stored display settings without performing a full detection and correction routine.

12. The system of claim 11 wherein at least part of the memory comprises display memory, and wherein the current display settings are stored in the display memory.

13. The system of claim 11 wherein the first token and the copy of the first token are communicated between the host computer system and the display through a control channel.

14. The system of claim 13 wherein the host computer system repeatedly sends the first token over the control channel for a period of time until the display responds with an acknowledgement or the period of time expires.

15. The computer-readable storage medium of claim 1 wherein the first token is stored as a hash and the copy of the first token is the same as the first token if the copy of the first token corresponds to the hash of the first token.

16. The computer-readable storage medium of claim 1 wherein the host computer system repeatedly sends the second command until the display returns an acknowledgement that the second command was received.

* * * * *